US008537726B2

(12) United States Patent
Kalhoff et al.

(10) Patent No.: US 8,537,726 B2
(45) Date of Patent: Sep. 17, 2013

(54) METHOD AND SYSTEM FOR SECURE DATA TRANSMISSION

(75) Inventors: Johannes Kalhoff, Blomberg (DE); Karsten Meyer-Graefe, Hoevelhof (DE)

(73) Assignee: Phoenix Contact GmbH & Co. KG (DE)

( * ) Notice: Subject to any disclaimer, the term of this patent is extended or adjusted under 35 U.S.C. 154(b) by 1260 days.

(21) Appl. No.: 11/939,283

(22) Filed: Nov. 13, 2007

(65) Prior Publication Data

US 2008/0150713 A1 Jun. 26, 2008

(30) Foreign Application Priority Data

Nov. 15, 2006 (DE) .......................... 10 2006 054 124

(51) Int. Cl.
*G06F 11/30* (2006.01)

(52) U.S. Cl.
USPC ........... 370/282; 370/241; 709/230; 340/502; 340/532

(58) Field of Classification Search
USPC ................ 370/241, 249, 252, 277–278, 282, 370/310; 709/227, 230–232, 236, 237; 340/500–509, 514, 531–533
See application file for complete search history.

(56) References Cited

U.S. PATENT DOCUMENTS

| 4,792,910 | A | | 12/1988 | Lange |
| 5,287,390 | A | * | 2/1994 | Scarola et al. ................ 376/216 |
| 5,469,150 | A | | 11/1995 | Sitte |
| 6,035,240 | A | * | 3/2000 | Moorehead et al. ............. 700/2 |
| 6,466,539 | B1 | * | 10/2002 | Kramer et al. ................ 370/216 |
| 6,631,476 | B1 | * | 10/2003 | Vandesteeg et al. ........... 714/4.4 |
| 6,999,824 | B2 | * | 2/2006 | Glanzer et al. ................ 700/18 |
| 7,093,244 | B2 | | 8/2006 | Lajoie et al. |
| 7,426,449 | B2 | * | 9/2008 | Henry et al. ................. 702/127 |
| 7,675,884 | B2 | * | 3/2010 | Ye ................................ 370/329 |
| 2002/0099465 | A1 | * | 7/2002 | Su ................................ 700/121 |
| 2002/0126620 | A1 | * | 9/2002 | Heckel et al. ................. 370/216 |
| 2002/0194365 | A1 | * | 12/2002 | Jammes ........................ 709/237 |

(Continued)

FOREIGN PATENT DOCUMENTS

| DE | 196 14 654 C1 | 8/1997 |
| DE | 19742716 A1 | 4/1999 |

(Continued)

OTHER PUBLICATIONS

Thorsten Doerre, "EP Patent Application No. 07 021 351.7 International Search Report", Jun. 5, 2009, Publisher: EPO, Published in: EP.

(Continued)

*Primary Examiner* — Michael Thier
*Assistant Examiner* — Curtis A Alia
(74) *Attorney, Agent, or Firm* — Kaplan Breyer Schwarz & Ottesen, LLP

(57) ABSTRACT

A method and system are disclosed that secure data transmission in a communications system employed to control safety-relevant processes, through the provision of cooperating evaluators arranged in a shared manner in communications stations in order to evaluate safety-oriented data in a simple and cost-effective way. In the disclosed method, a data report is transmitted from a first station, by means of a communications system designed for serial data transmission, to a second station and said data report is checked by means of a second evaluator arranged in the second station. Depending on the results of the check of the data report, an acknowledgement report is transmitted from the second station to the first station, which acknowledgement report likewise is checked by the evaluator arranged in the first station. Furthermore, the disclosed system carries out the method.

32 Claims, 5 Drawing Sheets

(56) References Cited

U.S. PATENT DOCUMENTS

| | | | |
|---|---|---|---|
| 2003/0050735 A1* | 3/2003 | Griffis | 700/255 |
| 2003/0051053 A1* | 3/2003 | Vasko et al. | 709/246 |
| 2003/0051203 A1 | 3/2003 | Vasko et al. | |
| 2006/0095518 A1* | 5/2006 | Davis et al. | 709/206 |

FOREIGN PATENT DOCUMENTS

| | | | |
|---|---|---|---|
| DE | 19922561 A1 | | 11/2000 |
| DE | 10014352 | | 10/2001 |
| DE | 10 2005 015 864 A1 | | 10/2006 |
| DE | 10 2005 049 931 A1 | | 4/2007 |
| DE | 19716197 A1 | | 10/2008 |
| EP | 33228 A2 | * | 8/1981 |
| EP | 1517203 A2 | * | 3/2005 |
| JP | 61021640 | | 1/1986 |

OTHER PUBLICATIONS

PROFIBUS Working Group, "PROFIsafe—Profile for Safety Technology", "PROFIBUS", Oct. 2002, No. 3.092, Publisher: PROFIBUS Nutzerorganisation e.V.

Peter Wratil, "Sicherer Datenverkehr", "Interbus", Sep. 2000, p. 38-, No. 18-25, Publisher: Elektronik Praxius.

W. Blome, et al., "Das Sprungbrett zur offenen Automatisierung", "InterBus", , pp. 60-66, No. 96/97, Publisher: InterBus, Sep. 2000.

Salvatore Cavalieri. et al., "Fault tolerance in Interbus-S standard", "Computer Standards & Interfaces", 2001, Publisher: Elsevier Science B.V., Published in: Italy.

P. Leterrier, "Interbus-loop: A low-cost Network having two wires", "Solutions", Nov. 1996, pp. 99-102, Publisher: Mesures 689.

* cited by examiner

METHOD AND SYSTEM FOR SECURE DATA TRANSMISSION

FIELD OF INVENTION

The invention relates in general to safety engineering of automation systems and, in particular to a method and system for secure data transmission between stations of a communications system employed to control a machine or installation.

BACKGROUND OF THE INVENTION

Safety engineering is employed for automated processes in the widest variety of industrial spheres, in order to protect employees from injury and to ensure the functional capability of machinery and installations. In safety-engineering applications the complete signal path of a safety function is taken in consideration. This is composed of secure apparatus, such as controllers, sensors or actuators and the connections thereof to one another. Said connections are designed for the most part in parallel wiring. However, parallel cabled routes require a high cost for fault detection of secure cabling. This occurs by means of a diagnosis function of the secure equipment in order to detect, e.g. a cross-circuit or short circuit or open connection. According to the safety requirement, said systems are designed to be redundant or, in part, also to be diverse in order to master or detect the possibility of occurring faults. This approach is impractical in planning and for some spheres of application and, moreover, frequently is expensive and cost-intensive to carry out.

A significant matter of expense within the costs for planning, cabling and equipment is the transformation cost for adapting the signal between logic signal and peripheral signal, which is incurred due to the interchange points between the input or output components and the control.

In modern systems, secure networks replace a large part of said routes with serial connections, since this simplifies the signal path between input or output components and the control. However, serial networking with current network solutions is very cost intensive and is used at present only for high-value finished equipment. The reason for this is the, at this time, different operating principle of cabling monitoring, redundancy in the cabling and the simplicity of the sensors, such as a purely mechanical opener. A combination of finished equipment with network connection and parallel wiring is not possible in this context. A network capable sensor, for example, therefore cannot simply be exchanged for a cabled sensor.

The transmission and processing of safety-oriented data in a serial communication system employed for control of an automation system is encumbered with special requirements. In this context, safety-oriented data denote such data as serve to control safety-relevant processes of a machine or installation, where each process is safety-relevant, from which the event of a fault can result in the origination of danger to people and/or material goods.

One approach according to the state of the art for this set of problems consists in constructing, in particular, the safety-oriented components of the system in a multi-channel way beyond a certain level of safety, i.e., redundantly. For example, in an automation bus system it can be provided that safety bus components, i.e., bus stations, for example, assigned to a safety-relevant machine are equipped with redundant hardware components. Simultaneously the central control and the bus also can be of a multi-channel construction or even a special, safety control for control of the safety-relevant components can be provided separate from the process controller and under certain circumstances with a redundant construction. The bus typically is provided with a secure protocol, with even the secure protocol itself being able to feature a redundancy. The safety control essentially carries out connections of safety-related input information and thereupon transmits safety-related connections to output components, for example, by means of an automation bus. The output components, for their part, process the received safety measures and, after a positive check of said safety measures, emit these to the peripheral. In addition they switch their outputs to a secure status if they detect a fault or have not received any more valid data within a specified amount of time. A control system for controlling safety-critical processes, for which the safety-related arrangements feature a multi-channel structure is known, e.g. from EP 1 188 096 B1.

Moreover it is known to furnish specially designed secure communication stations, for which an increase in security is achieved by means of a redundant evaluating logic in combination with a fail-safe comparator. This type of secure bus station is employed, for example, in systems based on the INTERBUS-safety system.

However, in the aforementioned systems, the redundant provision of hardware components leads in a disadvantageous way to increased expense and to increased cost.

SUMMARY OF THE INVENTION

Therefore the purpose of the invention is to indicate a way in which a secure data transmission can be provided in a communication system in a simple and cost effective way, in particular with the use of standard components and with the integration of simple, in particular mechanical sensors or actuators.

An additional purpose of the invention is to furnish a safety-related communications system that manages with limited hardware costs and that can be adapted in a flexible manner to the respective requirements.

Accordingly, a method according to the invention provides for secure data transmission between at least a first and a second station of a communications system designed for serial data transmission between said stations, initially the transmission of a data report from the first station to the second station. The data report is checked by a second evaluator arranged in the second station. Depending on the results of the check of the data report by means of the second evaluator, said evaluator generates an acknowledgement report that is transmitted from the second station to the first station. Preferably, an acknowledgement report is transmitted only in the event of a successful check of the data report. After being received by the first evaluator arranged in the first station, the acknowledgement report is checked. Therefore a redundant check is carried out by means of the first and second evaluator, with the first and second station forming a corresponding pair of stations.

It is especially preferable to employ the method in the sensor plane of systems for the control of safety-relevant automated processes. Accordingly, it is of particular advantage to design the first or second station as a sensor or actuator of an automation system. It therefore is advantageous for the data report to comprise an input or output signal of a sensor or actuator of said automation system.

It is advantageous for a check of the data report and/or of the acknowledgment report by the first or second evaluator to include a check for plausibility of the data contained in the report. Accordingly, preferably a check of the data contained in the data report to be emitted by the first station can occur by means of the first evaluator before said data report is transmitted to the second station, with, after acceptance of the data report, an additional check of the data contained therein carried out by means of the second evaluator in the second station. In this embodiment variant, the check of the acknowledgement report can be limited to a registering of acceptance of a predefined report.

In an additional advantageous embodiment, the second station generates, by means of the second evaluator, an acknowledgement report comprising data contained in the received data report. In this embodiment variant, a check of the acknowledgement report by means of the first evaluator comprises a comparison of data contained in the acknowledgement report with data contained in the previously transmitted data report. For this purpose, data transmitted by the first station in a data report are buffered at least until acceptance of the corresponding acknowledgment report.

In an again additional advantageous embodiment, the second station generates an acknowledgement report comprising an additional valid data report.

If an evaluator while checking the data report or acknowledgement report detects a fault, the station, the evaluator of which has detected the fault, preferably executes a safety-oriented function.

For data transmission between the stations it can be advantageous, according to the application, to provide a wired or wireless serial bus or a wired or non-contact operating network. In the simplest case a point-to-point protocol between the first and second station is used, with one of the stations being designed, e.g., as a sensor or actuator and the other as an input or output component, denoted in the following also as an I/O module.

Serial data transmission between the stations of the communications system occurs advantageously on the basis of a specified communications protocol. Since the aforementioned method advantageously can be employed both in standard sensor technology and actuator technology as well as also in security technology, in which additional demands can be placed on the communications protocol used, it is preferable to design the specified communications protocol optionally as either secure or non-secure.

Accordingly it is preferable to employ a specified secure communications protocol for control of safety-relevant processes, for which, for example, redundant data content enables an error detection, with a check of the data report and/or of the acknowledgement report by means of the first or second evaluator comprising a fault check according to the specified secure communications protocol. For this purpose, the secure communications protocol can comprise, e.g., a check totals method such as a CRC; cyclic redundancy check.

Moreover, a secure communications protocol advantageously can provide for a case in which a specific report is sent from all or from a specified group of stations of the communications system in a recurrent manner, e.g., once per communications cycle, which report, in addition, can change according to a defined algorithm.

The invention therefore advantageously is based on the principle of a serial secure connection between two stations. In order to reduce the secure and redundantly designed evaluator provided per [unit of] equipment according to the state of the art, part of the secure evaluator is relocated in each terminal. Security is made available redundantly by means of confirmation of the data.

Distributing the redundancy-ensuring security to two shared evaluators enables, to particular advantage, the use of standard components for the transmission of secure data.

In an additional embodiment of the method according to the invention, the second evaluator is arranged together with the first evaluator in a common subassembly that, in this embodiment, is of a two-channel design. In this embodiment as well, a two-channel standard component can be used to advantage.

Moreover, shared redundancy and, in particular, data exchange between the first and second evaluator enable the integration, to particular advantage, of simple and even mechanical components, such as standard or security switches designed as openers or closers, while maintaining security.

Accordingly, in an additional particularly preferred embodiment of the invention, switched between the first and second evaluator is a control element or sensor element that itself does not include an evaluator and is designed, in particular, as a simple, preferably mechanical sensor or actuator.

In this connection, the mechanical element preferably is connected to an output of the first evaluator and to an input of the second evaluator, with an output of the second evaluator being connected to an input to the first evaluator. This type of special cabling can be realized with particular ease with a first and second station arranged in a common subassembly.

In order to monitor the shared evaluators, it is preferable to insert, arranged in the respective station, a monitoring circuit, which monitors for validity the data stream to and/or from the respective allocated evaluator according to a specified protocol and in the event of a fault sets the associated evaluator and/or a sensor or actuator controlled by means of the associated evaluator to a secure status or uses a corresponding substitute value. An absent acknowledgement report or non-appearance of the valid data stream immediately conveys information about the occurrence of an error of the remote station.

As already cited above, the evaluators communicate to advantage with each other by means of a secure protocol and check the sent data as regards content. The monitoring circuit connected to the evaluator checks the data stream for validity, with, in the simplest case, this occurring by means of pattern recognition without knowledge of the secure contents.

Accordingly, monitoring of the data stream by means of the monitoring circuit includes, preferably, detection of at least one specified pattern. Advantageously, monitoring also can include a dynamic pattern detection, e.g., by means of a comparison of simple contents. For this purpose, the transmitted data reports can be provided with a date that changes according to a specified algorithm. The monitoring circuit can, moreover, monitor the evaluator assigned thereto for functional capability, e.g., by means of a watchdog-function. Designated as a watchdog function in this context is a function of the monitoring circuit that monitors the acceptance of regular signals from the associated evaluator and the non-appearance of said signals as a fault.

The aforementioned checking of a data or acknowledgement report by means of an evaluator, as well as the monitoring of the data stream by means of a monitoring circuit and/or the monitoring of the functional capability of an evaluator by means of a monitoring circuit typically include the execution of a function, with said function advantageously being available identically in the first and second evaluator. For this purpose, it is advantageous to provide a memory and microprocessor, with execution of the function including the execution, by means of the microprocessor, of a sequence code or program stored in the memory.

Based on the versatility of the sensor technology and actuator technology of an automation system and the multitude of different functions yielded from this, which cannot be unified arbitrarily, it is not expedient to provide the entire multitude of different functionalities by default in a station designed as an I/O module, which is employed as a station corresponding to a sensor or actuator.

In fact it is advantageous to transmit part of the safety-oriented application function and/or parameters required to execute said function stored in the sensor or actuator from said sensor or actuator to the corresponding station. This advantageously occurs within an initialization phase before acceptance of data exchange of safety-oriented data between the stations.

The corresponding station to which parts of a safety-oriented application function in the form of a program or a sequence code are transmitted from a station designed as a sensor or actuator preferably features a corresponding interpreter in order to execute said program or sequence code.

By means of downloading part of the application program of a sensor or actuator, particularly the part which is to be available redundantly in order to increase security, to the cooperating input or output components, said [input or output components] can help process the sensor or actuator application. The raw data required for this, such as sensor signals and the results required for reprocessing are exchanged serially between the stations. This enables, in a particularly advantageous way, a sensor or actuator to be manufactured more cost-effectively, since the interaction of the intelligent input or output equipment executing the transmitted application code, e.g., by means of an interpreter, causes only a single channel hardware to be required in the sensor or actuator.

Accordingly, the method provides in an advantageous manner, for a check of a data report by means of an evaluator, a check of an acknowledgement report by means of an evaluator, monitoring of the data stream by means of a monitoring circuit and/or monitoring of the functional capability of an evaluator by means of a monitoring circuit to occur by means of executing a function stored in the executing station, where prior to execution of the function, parts of the function to be executed and/or parameters for executing the function are transmitted from an additional station to the executing station.

Parts of an evaluation program to be executed by means of an evaluator can be transmitted to the respective station, as described above, from a different station, particularly from the evaluator of a corresponding sensor or actuator. Alternatively, the corresponding program parts also can be transmitted from a central controller, e.g. after said controller has searched the functionality of the corresponding sensor or actuator. Transmission of the program parts can be carried out automatically, to advantage as well as, if need be, depending on a preset configuring of the automation system. Transmission also can be carried out, according to the application, by means of a separate communications channel.

As already described above, the first or second station preferably is designed as a sensor or actuator. In order to communicate with higher-level data processors, a respective station corresponding to the sensor or actuator and designed, e.g., as an I/O module, preferably is connected to an additional, higher-level bus system.

Also, a multitude of first or second stations can be provided. For example, a multitude of stations designed as sensors or actuators can be connected, by means of a bus mountable in a serial manner, to a corresponding station. Advantageously, serial communication between the stations can occur according to the master/slave principle, with, e.g., the corresponding station forming the master and the stations designed as sensors or actuators forming the slaves.

Furthermore, the corresponding station can advantageously additionally be connected to a higher-level bus, which, e.g., is designed as a serial bus based on a field bus or Ethernet-based bus.

A system according to the invention for transmitting safety-oriented data for control of an automation system designed, in particular, in order to carry out the aforementioned method comprises a serial communications system having at least a first station and a second station connected thereto, at least a first evaluator arranged in the first station and at least a second evaluator arranged in the second station, with the second evaluator being designed to check a data report received from the first station and to generate an acknowledgement report dependent on the results of the check of said data report, the first evaluator being designed to check an acknowledgement report received from the second station and the first and/or second station being designed in order to execute a security function in the event of a fault.

It is particularly advantageous for the communications system for serial data transmission to feature a wired or wireless serial bus between the stations.

The first and/or second station is advantageously designed as a sensor or actuator of an automation system. The evaluators accordingly serve, in particular, to evaluate safety-oriented input and/or output data of a sensor and/or actuator having an influence on a security relevant process of an automation system.

The first and second evaluators thus form a shared redundancy, with the evaluators being arranged in different stations for said purpose.

In a preferred embodiment, the first and second stations form a corresponding station pair, with one of the stations being designed as a sensor or actuator and the other station being designed as a corresponding input or output component. Furthermore, the first and second evaluators arranged in corresponding stations can, to advantage, also incorporate the functionality of the respective other evaluator. Consequently, an interface active in both directions is furnished, such that the stations can be used as input or output components.

In order to evaluate input and/or output signals, e.g., sensor signals or control signals for actuators, it is preferable to design the first and/or second evaluator [with the ability] to check data contained in a data report or acknowledgement report for plausibility. Furthermore, the first and/or second evaluator can advantageously be designed in order to compare data contained in a data report with data contained in an acknowledgement report. In an additional advantageous embodiment, the first and/or second evaluator is designed in order to generate an additional valid data report as an acknowledgement report.

Furthermore, the system advantageously can feature any of the embodiment variations described above in conjunction with the method.

Accordingly, it is especially preferred to design the evaluators to be able to exchange data with the use of a secure communications protocol. For an application capability that is as flexible as possible, the evaluators preferably can display digital and analog values by means of the protocol, with running time data and parameter data for secure and non-secure applications also being able to appear in a mixed manner.

Furthermore, it is of particular advantage to integrate in the system simple, in particular, mechanical sensors or actuators that do not have an evaluator available to evaluate safety-oriented data, and for this purpose are switched between the first and second evaluator. The possibility also of employing, apart from network-capable sensors and actuators, mechanical standard components simplifies the repair of existing systems and is compatible with current sensors and actuators.

For a simple wiring of a mechanical standard component, the first and second stations advantageously are arranged in a common subassembly.

In order to further increase security, it is preferable to assign a monitoring circuit to every evaluator; said monitoring unit is designed to monitor the data stream to and/or from the associated evaluator according to a specified protocol for validity and in the event of a fault to set the associated evaluator and/or a sensor or actuator controlled by means of said associated evaluator to a secure status.

For this purpose, the monitoring circuit preferably is designed to recognize a specified static or dynamic pattern and moreover can feature a watchdog function in order to monitor the functional capability of the associated evaluator. In the simplest case, a survival monitoring of the single channel hardware is sufficient in order to control the safety process and in the event of a fault to provide the input or output for ensuring security with a default value.

As already described above in conjunction with the method, the communications system advantageously is designed as a master/slave system, with the first or second station forming the master. Furthermore, the first or second station preferably is connected to an additional, higher-level communications system in order to exchange data with a higher-level data processor or data controller.

In order not to have to hold functionalities of the evaluators for each conceivable application in every station, the first and/or second station advantageously are designed in order to be able to request parts of functions and/or parameters from an additional station.

Accordingly, it is preferable for at least one station to be designed in order to be able to carry out a check of a data report by means of an evaluator, a check of an acknowledgement report by means of an evaluator, a monitoring of the data stream by means of a monitoring circuit and/or a monitoring of the functional capability of an evaluator by means of a monitoring circuit by means of executing a function stored in the station, with at least one station moreover being designed in order to be able to request parts of functions and/or parameters from a different station in order to execute the function.

Advantageously, the corresponding station features a memory in order to store the sequence code of the function to be executed in which is stored a basic functionality of the station and in which are filed, in addition, parts of functions and/or parameters requested according to need or automatically obtained in the start-up phase of the system. In order to execute the function, the station advantageously features a microprocessor. Furthermore, in order to enhance the flexibility, an interpreter is provided to advantage in the station, which [interpreter] is employed in order to execute the additional parts of functions.

The additional parts of functions and/or parameters also can be made available to advantage from a central controller, e.g., depending on a specified configuring of the automation system.

The invention enables, in a simple way, a secure data communication. The sensors or actuators equipped according to the invention can be produced more cost effectively and with a more limited variance. This also applies to I/O cards of automation systems designed as central subassemblies or peripheral network stations.

Furthermore, the present invention simplifies current installation guidelines, lessening the influence of human error and ignorance on the function of the safety technology with regard to the connected sensors and actuators.

BRIEF DESCRIPTION OF THE DRAWINGS

The invention is expounded upon in the following per example with the aid of preferred embodiments and with reference to the enclosed drawings. In this connection, identical reference numbers in the drawings denote identical or similar parts.

Shown are.

DETAILED DESCRIPTION

Figure 1A:
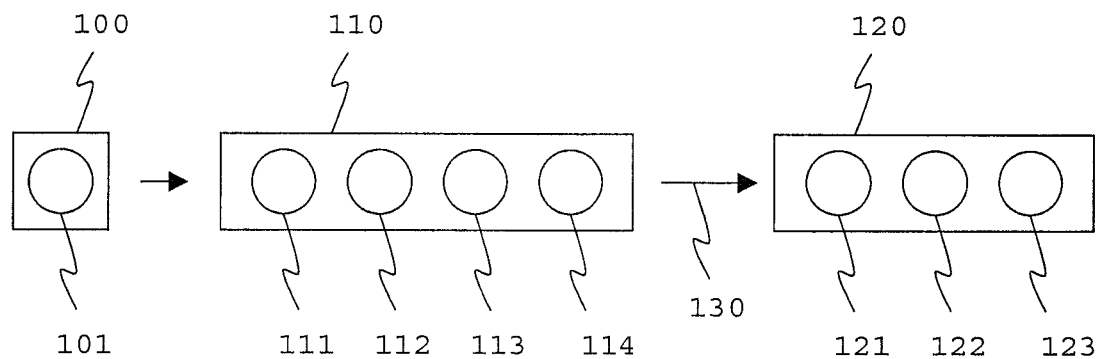
FIG. 1a: a schematic diagram of an example of a signal path of an input signal toward a controller, with parallel connection.
Figure 1B:
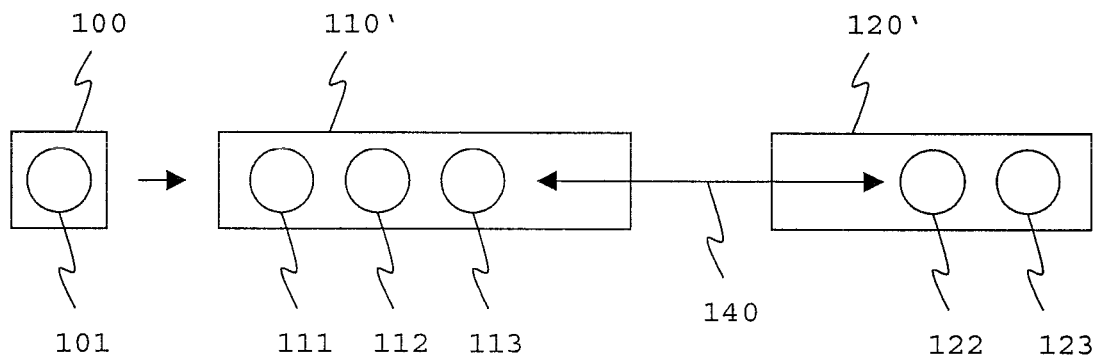
FIG. 1b: a schematic diagram of an example of a signal path of an input signal toward a controller, with serial connection.

FIGS. 1a and 1b show, for a safety application, an example of the signal path of an input signal from a sensor toward an I/O module designed as an input component, with the typical cost for a parallel and a serial connection being compared.

As illustrated in FIG. 1a, a physical quantity (101) of a process (100) is determined. In order to do so, first a measurement of a typical analog quantity is undertaken by means of a sensor (111) in a unit (110) near the process. This electrically evaluable measuring quantity is converted by means of an A/D converter (112) into a digitally processable quantity and is processed into a digital application value by a processing module (113). For parallel wiring there now occurs, for the purpose of data transmission to an I/O module (120), likewise a conversion of the digital application value into a standard signal by means of a D/A converter (114). Said standard signal now is transmitted by means of a cabling (130), e.g. by means of terminal connections, sub-distribution boards, etc., to the I/O module (120), with, typically, special requirements to be set on the cabling for the transmission of safety-oriented signals. In the I/O module (120), the A/D converter (121) carries out a re-conversion of the transmitted signal to the digital application value, which is processed by means of a processing module (122) and if necessary, transposed, e.g., in a network protocol, for routing to continuative systems by means of converter (123).

The invention simplifies the signal path for safety engineering purposes in a way that minimizes costs for equipment, sensor technology or actuator technology and cabling. For this purpose, the invention, as illustrated in FIG. 1b, advantageously provides for a direct serial connection (140)

between the processing modules (113, 122) of the sensor module (110') or of the I/O module (120').

Serial bus systems for control of sensors and actuators indeed are already known to some extent in non-security-relevant systems from the state of the art; however, demands are added in safety engineering that cannot be fulfilled by the state of the art.

One possibility for compliance with safety requirements would consist in providing the sensors or actuators with redundant evaluators. In order to minimize hardware costs, it is, in contrast, advantageous in a system according to the invention to provide a shared redundancy of the evaluators by arranging each respective evaluator in corresponding stations.

Figure 2:
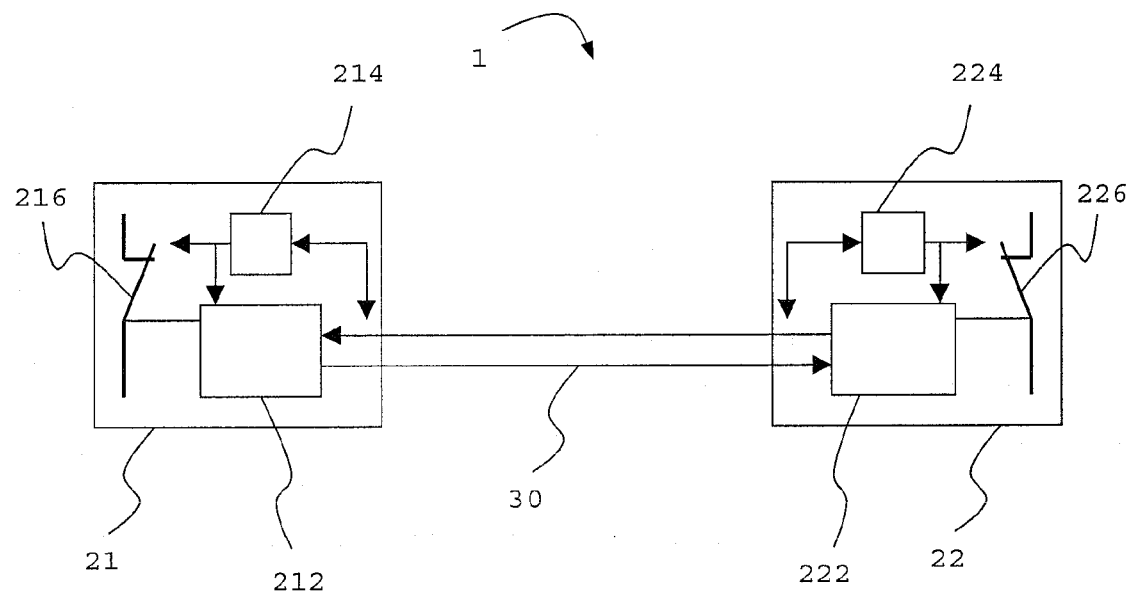
FIG. 2: a schematic diagram of an embodiment having a first and second station.

Illustrated in FIG. 2, by way of example, is a serial communications system (1) which is suitable for employment of the invention and which comprises two stations (21, 22), between which a serial secure connection exists by means of the bus system (30). The bus stations (21, 22) contain, respectively, one evaluator (212, 222) forming one part respectively of a corresponding pair of evaluators in order to achieve a shared redundancy. The stations (21, 22) further contain, respectively, a monitoring circuit (214, 224) that monitors the data stream, as well as an interface to a safety-relevant application (216, 226) represented symbolically in FIG. 2 as a switch. The safety-relevant application typically comprises an executable program filed in a memory, which program is suitable for having an influence on potentially dangerous processes of an automation system.

The evaluators (212, 222) communicate with each other by means of a secure protocol and check the contents of sent data. Acknowledgement of the data makes security available in a redundant manner. The monitoring circuit (214, 224) switched on at the respective evaluator checks the data stream for validity by means of pattern recognition and in the event of a fault sets the evaluator (212, 222) to a secure status.

Figure 3:
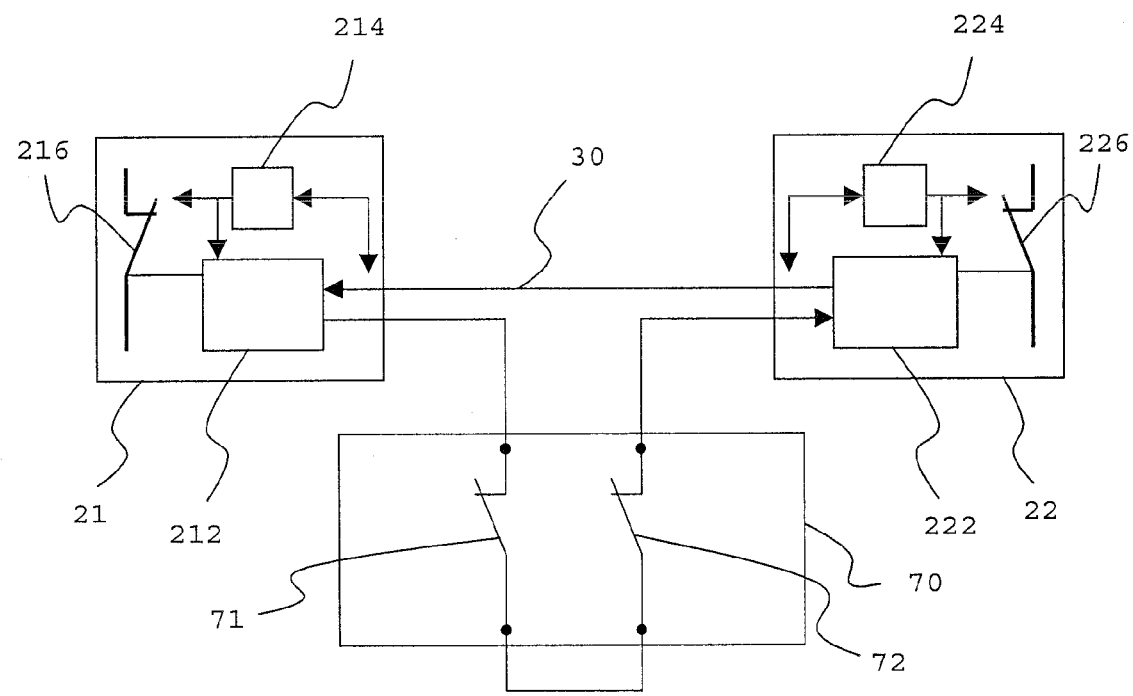
FIG. 3: a schematic diagram of an embodiment, for which an emergency shut-off is switched between a first and second station.

As illustrated in FIG. 3, the invention also enables the connection of simple mechanical controller and sensor elements. Illustrated in turn are the stations (21, 22) connected to each other by means of a serial bus system (30). In this embodiment, the bus stations (21, 22) are wired to the mechanical emergency stop button (70) in such a way that the signal path progresses from the output of the evaluator (212) to the input of the evaluator (222) through the emergency stop button (70), passing the integrated redundant switches (71, 72). The emergency stop button (70) is designed such that for a manual actuation, both switches (71, 72) are activated simultaneously. A data exchange between the shared evaluators (212, 222) causes actuation of the emergency stop button to be securely recognized. Apart from the openers (emergency stop button) illustrated, closers and closer/opener combinations can find application by means of corresponding circuits. These can find application also with a separate test signal feed or common test signal feed.

Figure 4:
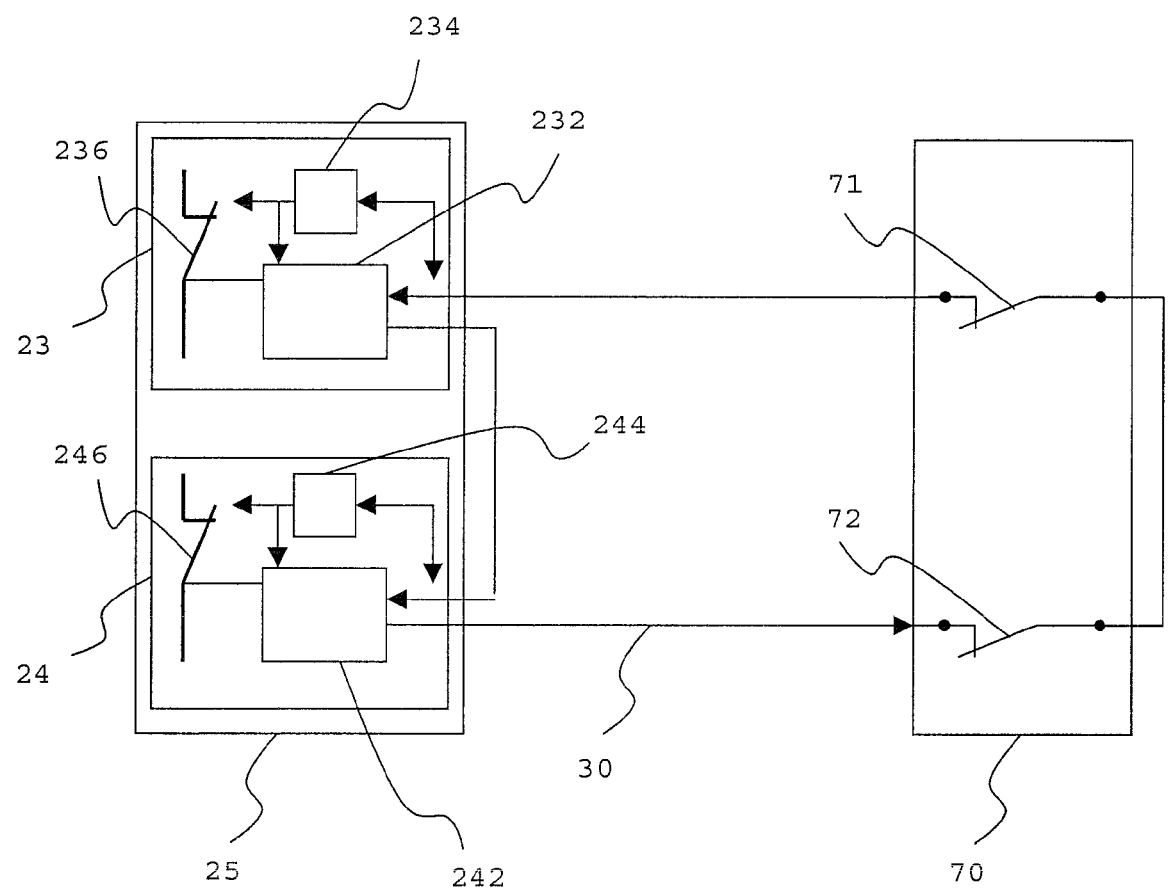
FIG. 4: a schematic diagram of an embodiment, for which an emergency shut-off is switched between a first and second station, with the first and second stations being arranged in a common subassembly.

FIG. 4 shows a preferred modification of the embodiment illustrated in FIG. 3, for which the stations (23, 24), corresponding, in essence, to the stations (21, 22), are arranged in a common subassembly (25) connected to the emergency stop button (70). The stations (23, 24) comprise, likewise, evaluators (232, 242), as well as associated monitoring circuits (234, 244), as well as interfaces to safety-relevant applications (236, 246). In this embodiment, the signal path progresses from the output of the evaluator (242) to the input of the evaluator (232) through the switches (71, 72) of the emergency stop button (70), with the corresponding output of the evaluator (232) being connected to the corresponding input of the evaluator (242b).

Figure 5:
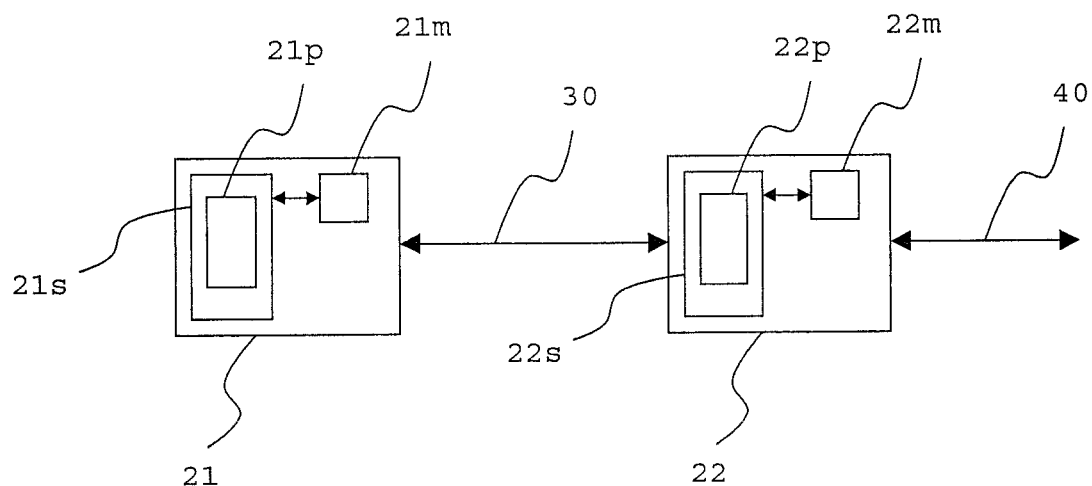
FIG. 5: a schematic diagram of a first embodiment variant of the functional components of the first and second station illustrated in FIG. 2, FIG. 6: a schematic diagram of a second embodiment variant of the functional components of the first and second station illustrated in FIG. 2, FIG. 7: a schematic diagram of an embodiment, in which serial communication between the first and second stations occurs wirelessly.

FIG. 5 shows a schematic diagram of the functional components of the first and second stations (21, 22) illustrated in FIG. 2. In order to execute a safety-relevant application, a memory (21s, 22s), in which is filed one executable sequence code respectively (21p, 22p), is provided in each station (21, 22). In order to execute the application, one microprocessor (21m, 22m) is respectively provided in the stations (21, 22), which [microprocessor] possesses access to the respective memory.

In the embodiment illustrated, the station (21) is designed as a sensor and the station (22) is designed as an I/O module, which communicate with each other by means of the serial bus system (30). The I/O module (22) acting as an input component additionally is connected to a higher-level communications system (40) which enables, e.g., communication with a higher-level controller.

The applications (21p, 22p) are essentially identical in the illustrated embodiment, in order to be executed by the corresponding evaluators (212, 222) illustrated in FIG. 2.

Figure 6:
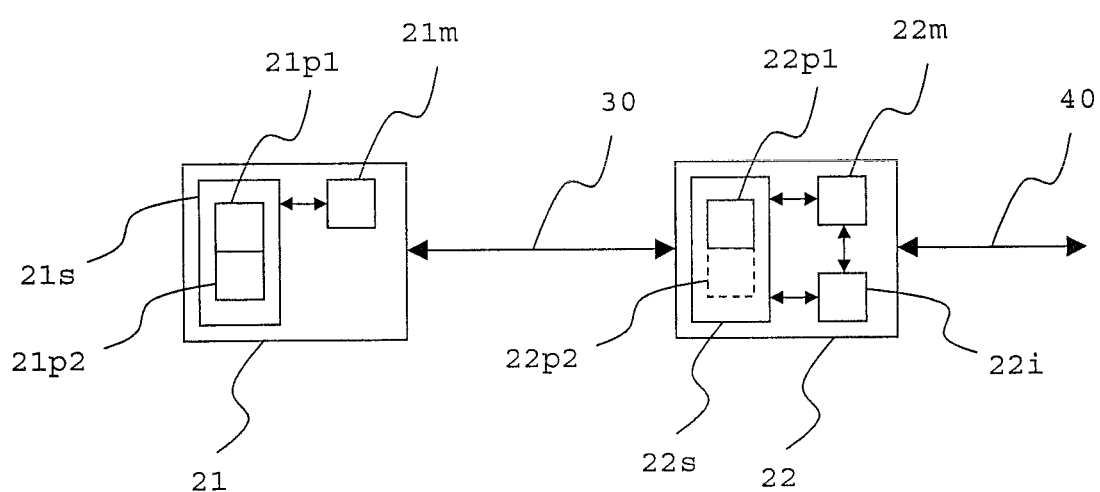

FIG. 6 shows a preferred embodiment variant of the functional components of the first and second stations (21, 22) illustrated in FIG. 2, with, likewise, the station (21) being designed as a sensor and the station (22) being designed as a corresponding I/O module. In this embodiment variant, the station (21) has available a security application, stored in the memory (21s), comprising the application parts (21p1, 21p2), which initially are in part or wholly unavailable in the corresponding station (22).

In the illustrated embodiment, the station (22) has available a basic functionality (22p1) stored in the memory (22s) thereof, which corresponds to the application part (21p1). In the start-up phase of the system, the station (22) requests the missing application part (21p1) of the station (21), which thereupon transmits this [21p1] to the station (22). The station (22) stores the received application part (22p2) in the memory (22s). In order to ensure a high degree of flexibility, an interpreter (22i) moreover is provided in this embodiment in the station (22), which [interpreter] has access to the memory (22s) and is connected to the microprocessor (22m). The interpreter (22i) is designed to interpret at least the sequence code (22p2) additionally made available and therefore to enable execution by means of the microprocessor (22m).

The additional application part (22p2) also can alternatively be transmitted to the station (22) from a central controller on the basis of a projection of an automation system by means of the higher-level communications system (40). Transmission also can occur, e.g., by means of a separate communications channel.

Figure 7:
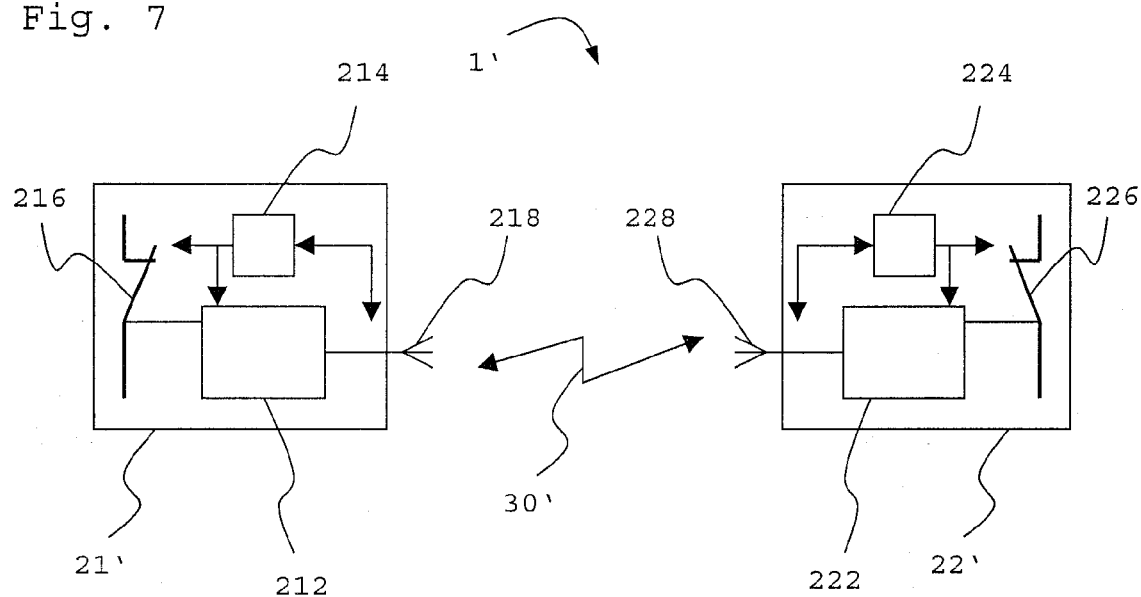

FIG. 7 shows a communications system (1') having the stations (21', 22'), which, in a modification to the stations (21, 22) illustrated in FIG. 2, communicate by means of a wireless serial interface (30'). For this purpose, the stations (21', 22') feature corresponding tranceivers (218, 228) that enable a secure wireless serial communication between the stations (21', 22'). Otherwise the construction of the stations (21', 22') corresponds to that of the stations (21, 22) illustrated in FIG. 2.

Figure 8:
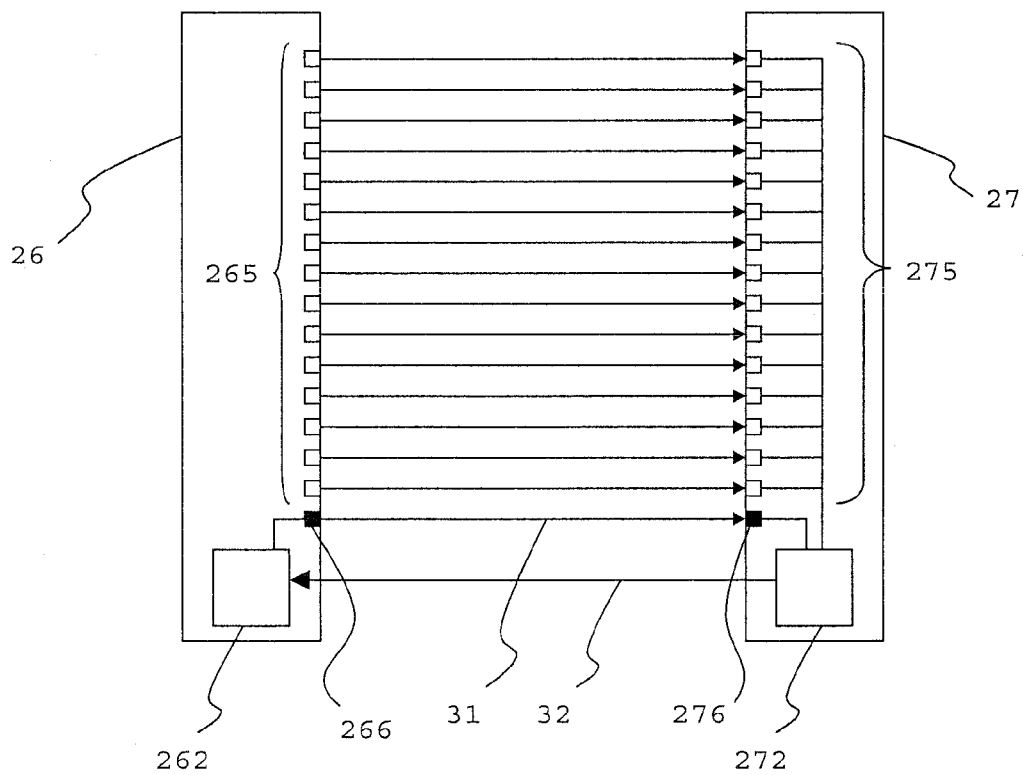
FIG. 8: a schematic diagram of an embodiment, in which the first and second stations form a light grid.

An additional embodiment of the invention is illustrated in FIG. 8. Provided is a light grid having a transmitter (26) and receiver (27). The transmitter (26) comprises a multitude of light sources (265), an evaluator (262) as well as a separately controllable light source (266). The receiver (27) comprises a multitude of light sensors (275), an evaluator (272) as well as a light sensor (276) that can be controlled separately. The transmitter (26) and receiver (27) form a first and second station of a serial communications system. Serial data exchange between the evaluator (262) and the evaluator (272)

occurs in this embodiment by means of an optical data transmission channel formed by means of the light source (266) and light sensor (276) and an electric feedback channel (32).

The invention claimed is:

1. A method for secure data transmission between at least a first and a second station of a communications system designed for serial data transmission between said stations, with the first station comprising a first evaluator and the second station comprising a second evaluator, the method comprising:
   transmitting a data report from the first station to the second station;
   checking said data report by means of the second evaluator arranged in the second station;
   transmitting an acknowledgement report from the second station to the first station depending on the results of the check of the data report; and
   checking the acknowledgement report by means of the first evaluator arranged in the first station, wherein a redundant evaluation of safety-oriented data is performed, wherein said safety-oriented data serves to control safety-relevant processes of a machine or installation;
   wherein in said evaluation the first and second evaluators respectively form one part of a corresponding pair of evaluators for achieving a shared redundancy,
   wherein each of the first and second evaluators is adapted to incorporate a functionality of the respective other evaluator; and
   wherein said functionality comprises the ability to evaluate at least one of safety-oriented input data of a sensor and safety-oriented output data of an actuator.

2. The method according to claim 1, with serial data transmission occurring between the stations by means of a data transmission protocol.

3. The method according to claim 1, with serial data transmission occurring between the stations by means of a serial bus of wired or wireless design.

4. The method according to claim 1, with the first and/or second station being designed as a sensor or actuator of an automation system.

5. The method according to claim 1, with the data report comprising an input or output signal of a sensor or actuator.

6. The method according to claim 1, with a check of the data report and/or of the acknowledgement report comprising a check for plausibility of the data contained in said report.

7. The method according to claim 1, with a check of the acknowledgement report comprising a comparison of data contained in the acknowledgement report with data contained in the data report.

8. The method according to claim 1, with the acknowledgment report comprising an additional valid data report.

9. The method according to claim 1, with a controller or sensor that does not include an evaluator being switched between the first and second station.

10. The method according to claim 9, with the controller or sensor being designed as a mechanical element.

11. The method according to claim 1, with a monitoring circuit being assigned to each evaluator, wherein the monitoring circuit monitors the data stream to and/or from the associated evaluator for validity according to a specified protocol and, in the event of a fault, sets the associated evaluator and/or the sensor or actuator controlled by means of the associated evaluator to a secure status.

12. The method according to claim 11, with monitoring of the data stream by means of the monitoring circuit comprising the recognition of a specified pattern.

13. The method according to claim 11, with the monitoring circuit monitoring the functional capability of the associated evaluator.

14. The method according to claim 1, with the check of the data report by the second evaluator, the check of the acknowledgement report by the first evaluator, the monitoring of a data stream by means of a monitoring circuit and/or the monitoring of the functional capability of associated evaluator by means of the monitoring circuit occurring by means of execution of a function stored in an executing station, and with, prior to execution of the function, parts of the function to be executed and/or parameters for executing the function being transmitted from an additional station to the executing station.

15. The method according to claim 1, with the communications system comprising the first and second station being designed as a master/slave system, with the first or second station being designed as the master.

16. The method according claim 1, with the first or second station being connected to a higher-level bus system.

17. A system for transmission of safety-oriented data for control of an automation system, comprising:
   a serial communications system having at least a first and a second station connected thereto;
   a first evaluator arranged in the first station; and
   a second evaluator arranged in the second station, with the second evaluator being designed in order to check a data report received from the first station and in order to generate an acknowledgement report depending on the results of the check of the data report, the first evaluator being designed in order to check the acknowledgement report received from the second station, and with the first and/or second station being designed in order to execute a security function in the event of a fault;
   wherein the first and second evaluators respectively form one part of a corresponding pair of evaluators for achieving a shared redundancy;
   wherein the pair of evaluators are adapted to perform a redundant evaluation of safety-oriented data, wherein said safety-oriented data serves to control safety-relevant processes of a machine or installation, wherein each of the first and second evaluators is adapted to incorporate a functionality of the respective other evaluator; and
   wherein said functionality comprises the ability to evaluate at least one of safety-oriented input data of a sensor and safety-oriented output data of an actuator.

18. The system according to claim 17, with a data transmission protocol of the communications system being designed as a secure communications protocol.

19. The system according to claim 17, with the communications system for serial data transmission between the stations comprising a wired or wireless serial bus.

20. The system according to claim 17, with the first and/or second station being designed as a sensor or actuator of the automation system.

21. The system according to claim 17, with the first and/or second evaluator being designed in order to check data contained in the data report or acknowledgement report for plausibility.

22. The system according to claim 17, with the first and/or second evaluator being designed in order to compare data contained in the data report with data contained in the acknowledgment report.

23. The system according to claim 17, with at least the second evaluator being designed in order to generate the acknowledgement report, which comprises an additional valid data report.

24. The system according to claim 17, with a controller or sensor element which does not include an evaluator, being switched between the first and second station.

25. The system according to claim 24, with the controller or sensor being designed as a mechanical element.

26. The system according to claim 17, with the first and second stations being arranged in a common subassembly.

27. The system according to claim 17, with a monitoring circuit being assigned to each evaluator, wherein the monitoring circuit is designed in order to monitor a data stream to and/or from the associated evaluator for validity according to a specified protocol and, in the event of the fault, sets the associated evaluator and/or the sensor or actuator controlled by means of the associated evaluator to a secure status.

28. The system according to claim 27 with the monitoring circuit being designed in order to recognize a specified pattern.

29. The system according to claim 27, with the monitoring circuit being designed in order to monitor the functional capability of the associated evaluator by means of a function.

30. The system according to claim 17, with at least one station being designed in order to carry out a check of the data report by means of its associated evaluator, a check of the acknowledgement report by means of the associated evaluator, the monitoring of the data stream by means of a monitoring circuit and/or the monitoring of the functional capability of the associated evaluator by means of a monitoring circuit executing a function stored in the station with the at least one station moreover being designed, in order to execute the function, to request executable parts of functions and/or parameters from an additional station.

31. The system according to claim 17, with the communications system comprising the first and second stations, being designed as a master/slave system, with the first or second station being designed as the master.

32. The system according to claim 17, with the first or second station being connected to an additional, higher-level communications system.

* * * * *